US005842786A

United States Patent [19]

Solomon

[11] Patent Number: 5,842,786

[45] Date of Patent: Dec. 1, 1998

[54] METHOD AND DEVICE FOR MIXING MEDICAL COMPOSITIONS

[76] Inventor: Alan Solomon, 16 Fox Run Rd., Dover, Mass. 02030

[21] Appl. No.: 813,702

[22] Filed: Mar. 7, 1997

[51] Int. Cl.[6] .......... B01F 15/02; B01F 13/02; B29B 7/16

[52] U.S. Cl. .......... 366/139; 366/189; 366/194; 222/235

[58] Field of Search .......... 366/139, 189, 366/194, 195, 242, 244, 245, 247, 182.3, 182.1, 182.2, 348, 325.92; 606/93, 92; 222/225–234

[56] References Cited

U.S. PATENT DOCUMENTS

| | | | |
|---|---|---|---|
| 4,277,184 | 7/1981 | Solomon | 366/139 |
| 4,647,215 | 3/1987 | Armitage et al. | 366/343 |
| 4,889,432 | 12/1989 | Patterson | 366/139 |
| 4,952,065 | 8/1990 | Kreuziger | 366/139 |
| 4,973,168 | 11/1990 | Chan | 366/139 |
| 5,071,040 | 12/1991 | Laptewicz, Jr. | 606/63 |
| 5,193,907 | 3/1993 | Faccioli et al. | 366/139 |

*Primary Examiner*—Tony G. Soohoo
*Attorney, Agent, or Firm*—Wood, Phillips, VanSanten, Clark & Mortimer

[57] ABSTRACT

An apparatus is provided for preparing a medical composition including a first member defining a mixing chamber having a predetermined amount of a first medical component contained therein, the first member having first and second openings each in communication with the mixing chamber, and a mixing subassembly operatively connected to the first member so that the mixing subassembly substantially seals the first opening, the mixing subassembly including a mixing member and a second member receivable one within the other. The first member and mixing subassembly are slidable guidingly, one within the other, between first and second relative positions with the first member and mixing subassembly operatively connected. The mixing member is supported for rotation relative to the first member about a first axis and includes a shaft and a plurality of paddles projecting radially from the shaft relative to the first axis and spaced, each from the other, axially relative to the first axis.

23 Claims, 5 Drawing Sheets

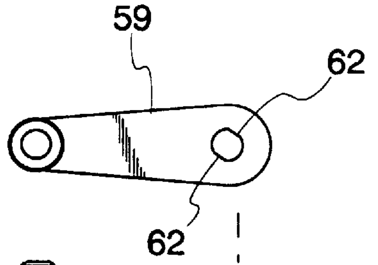
Fig. 2c
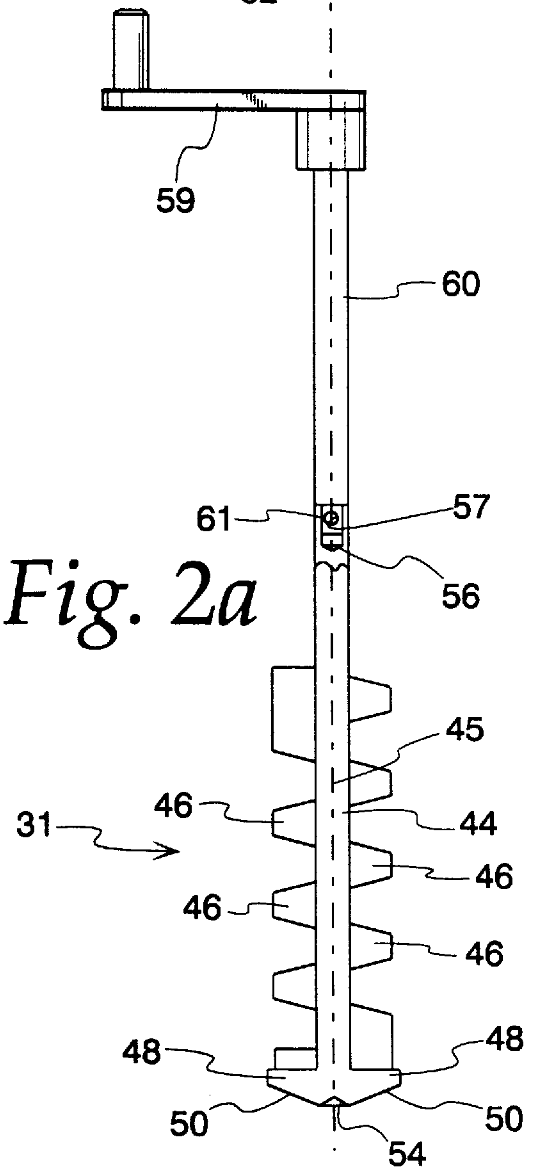
Fig. 2a
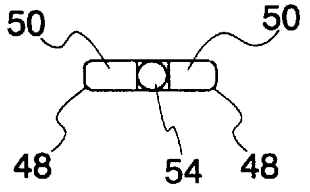
Fig. 2b
Fig. 3a
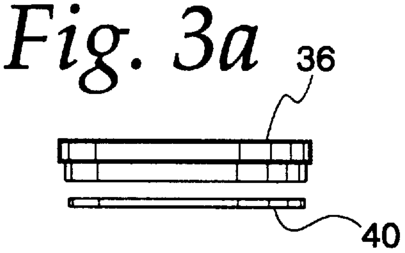
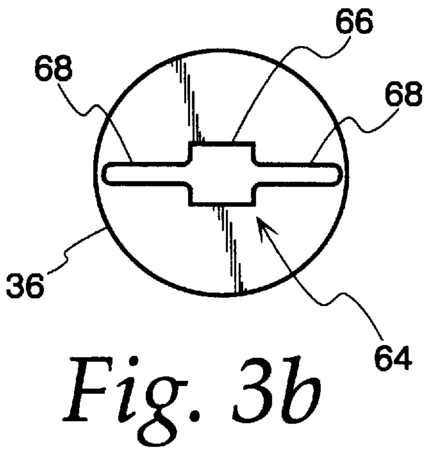
Fig. 3b

METHOD AND DEVICE FOR MIXING MEDICAL COMPOSITIONS

FIELD OF THE INVENTION

The present invention is directed toward a device for mixing and/or dispensing medical compositions.

BACKGROUND OF THE INVENTION

During orthopedic surgery, bone cement is generally used to secure a metal or plastic prosthesis onto living bone. The bone cement includes a polymerizate, such as liquid methyl methacrylate monomer, mixed with an activator, such as a powdered mixture of polymethyl methacrylate, methyl methacrylate-styrene copolymer and barium sulfate. The mixture is typically prepared just prior to use. The bone cement mixture is injected as a viscous fluid onto the osteopathic site and is polymerized in situ and in vivo to provide a solid implementation.

Typically, bone cement of the above-described type is mixed in one vessel and then transferred to another entirely separate vessel, e.g., a syringe, for application by a surgeon. Transferring the mixed cement from the mixing vessel to the syringe exposes the mixed cement to the atmosphere, thus incurring various risks such as contamination by infectious substances, delays due to unwieldy manipulations, polymerization problems resulting from excessive exposure to air, escape of toxic fumes generated during polymerization, and the undesirable potential exposure to blood which causes a weak cement bond.

U.S. Pat. No. 4,277,184 discloses an apparatus for mixing and dispensing bone cement. The powder and liquid components of the bone cement are manually introduced into the apparatus, and then the bone cement is mixed in and dispensed from the apparatus.

SUMMARY OF THE INVENTION

An apparatus is provided for preparing a medical composition including a first member defining a mixing chamber having a predetermined amount of a first medical component contained therein, the first member having first and second openings each in communication with the mixing chamber, and a mixing subassembly operatively connected to the first member so that the mixing subassembly substantially seals the first opening, the mixing subassembly including a mixing member and a second member receivable one within the other. The first member and mixing subassembly are slidable guidingly, one within the other, between first and second relative positions with the first member and mixing subassembly operatively connected. The mixing member is supported for rotation relative to the first member about a first axis and includes a shaft and a plurality of paddles projecting radially from the shaft relative to the first axis and spaced, each from the other, axially relative to the first axis.

The mixing member and the second member may be repositionable relative to each other in a direction substantially parallel to the first axis between (a) a first relative position wherein a plurality of paddles on the mixing member reside within the second member and (b) a second relative position wherein a plurality of paddles on the mixing member project from the second member into the mixing chamber.

The second member may comprise a body and a disc rotatably mounted relative to the body.

The mixing member and disc may be keyed against rotation relative to each other about the first axis with the mixing member and second member in each of the first and second relative positions.

The apparatus may be provided in combination with a second medical component combinable with the first component by introduction through the second opening into the mixing chamber.

The first member may have a third opening in communication with the mixing chamber, wherein movement of the mixing subassembly in a first direction relative to the first member between the first and second relative positions for the mixing subassembly and first member effectuates dispensing of a prepared medical composition in the mixing chamber through the third opening.

Means operatively connected to the mixing member may be provided for rotating the mixing member.

The first member with the predetermined amount of the first medical component and operatively connected to the mixing subassembly may be provided as a kit packaged in a hermetically sealed container.

The above and other novel features of the present invention will be more fully apparent from the following detailed description when the same is read in connection with the accompanying drawings.

BRIEF DESCRIPTION OF THE DRAWINGS

FIG. 2A is a plan view of the mixing member operatively connected to a hand crank;

FIG. 2B is a front elevation view of the mixing member;

FIG. 2C is a front elevation view of the hand crank;

FIG. 3A is a plan and exploded view of the rotating disc and retaining wire defining the reciprocable member;

FIG. 3B is a front elevation view of the rotating disc;

DETAILED DESCRIPTION OF THE PREFERRED EMBODIMENT

Figure 1:
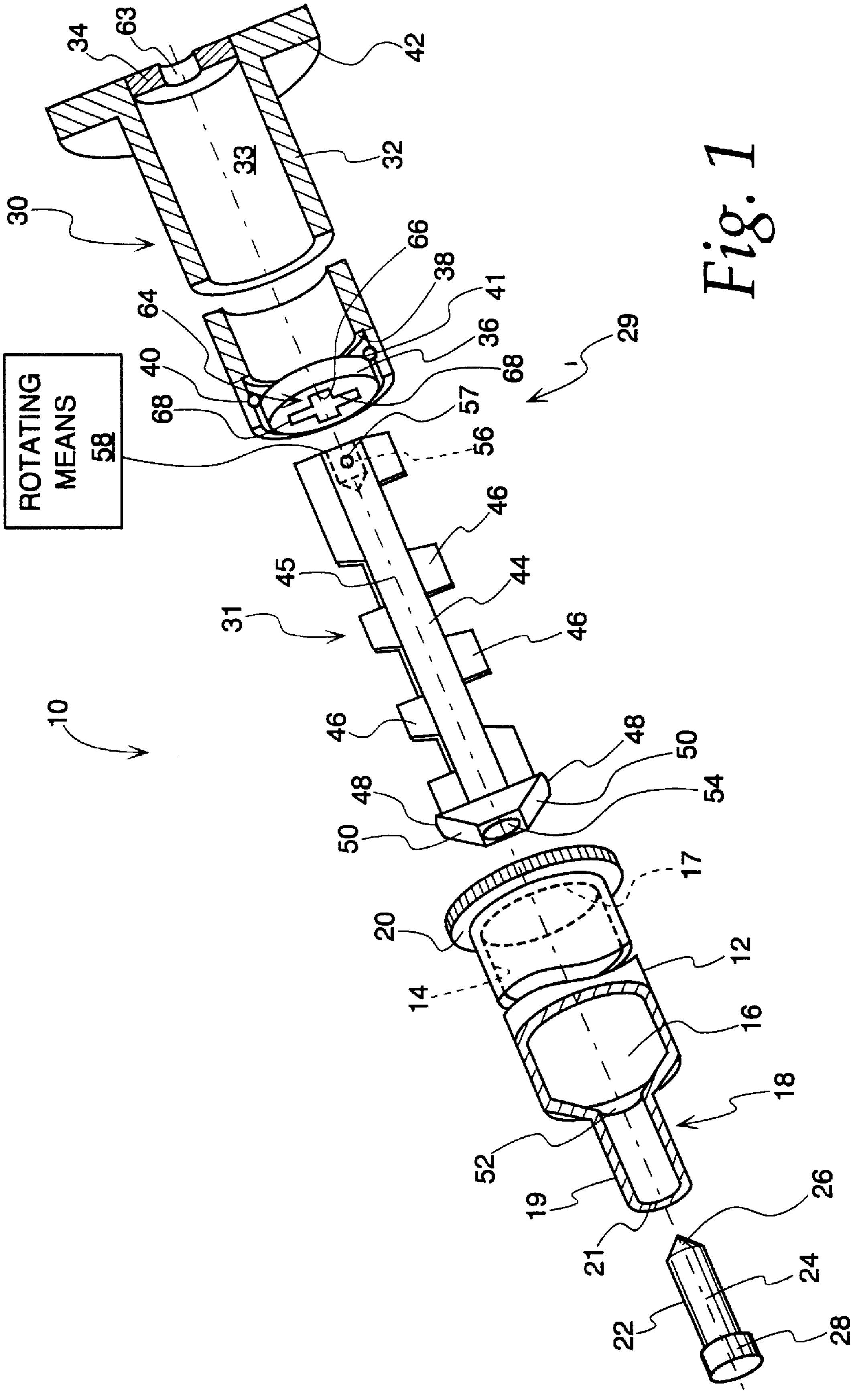
FIG. 1 is perspective and exploded view of the various component parts of a mixing device in accordance with the present invention, including a closure member, a cylindrical member, a mixing member and a reciprocable member.

Referring to FIG. 1, a perspective and an exploded view of the inventive mixing device is shown at 10. The elements in FIG. 1, when assembled as will be more fully described below, will provide a closed system permitting medical compositions, such as, but not limited to, bone cement, to be mixed in and dispensed from one and the same container thereby minimizing exposure of the cement to ambient conditions. A prior art mixing device of the above-described general type is disclosed in U.S. Pat. No. 4,277,184, which issued to the inventor herein and is incorporated by reference herein.

The mixing device 10 includes a cylindrical member 12 having a hollow inside 14. The cylindrical member 12 has a mixing chamber 16 with an open upper end 17 and tapers to a lower reduced diameter end 18 defining a neck 19. The neck 19 serves as a dispensing nozzle for the bone cement and, if desired, may include extensions as is generally known in the art. The open upper end 17 is provided with a peripheral flange 20 which may be engaged by a surgeon to facilitate manual dispensing of the mixed cement therefrom through an opening 21 formed in the neck 19.

A closure member 22 has a cylindrical shaft portion 24 with a diameter substantially equal to the inner diameter of the neck 19 to provide for a snug, frictional fit when the closure member 22 is inserted into the neck 19. The closure member 22 has a conical nose portion 26 at one end which, with the closure member 22 inserted fully into the neck 19, protrudes into the mixing chamber 16. An enlarged cap 28 is disposed at other end of the closure member 22 facilitating insertion and removal of the closure member 22 by a user. The closure member 22 may alternatively be threaded to the neck 19, or connected in any other conventional manner to hermetically seal off the same.

A mixing subassembly, shown generally at 29, is slidable guidingly within the cylindrical member 12. The mixing subassembly 29 is inserted into the open upper end 17 of the cylindrical member 12, thereby substantially sealing the open upper end 17. The mixing subassembly 29 is repositionable within the cylindrical member 12 between a first relative position where the mixing subassembly 29 extends fully into the mixing chamber 16 and a second relative position where the mixing subassembly 29 is substantially withdrawn from the mixing chamber 16.

The mixing subassembly 29 includes a member 30 and a mixing member 31 slidably receivable within the member 30 for movement between a first relative position where the mixing member 31 resides substantially within the member 30 and a second relative position where the mixing member 31 projects from the member 30 and into the mixing chamber 16.

The member 30 reciprocates within the mixing chamber 16 and includes a cylindrical body 32 defining a holding chamber 33 and having a cap 34 at one end and a disc 36 rotatably mounted at the other end. The diameter of the cylindrical body 32 is selected so that the member 30 fits snugly but slidably within the chamber 16 so that it may be guidingly axially displaced therein while substantially sealing the same. The cylindrical body 32 has a peripheral shoulder 38 within which the disc 36 nests. The disc 36 is held in place by a retaining wire 40 which frictionally fits in a groove 41 formed in the inner surface of the cylindrical body 32. It should be noted that the disc 36 may be rotatably mounted to the body 32 of the member 30 by any conventional mounting means which facilitates rotation of the disc 36 while securing the same to the body 32. The cylindrical body 32 is provided at its upper end with a flange 42. The surgeon is thus allowed to controllably displace the member 30 by grasping the flanges 20,42 as he/she would a conventional syringe, and pressuring the thumb against the flange 42 while holding the flange 20 with two fingers to thereby discharge the contents of the chamber portion 16.

The mixing member 31 includes an elongate shaft portion 44 extending along an axis 45 and having a plurality of interdigitated paddles 46 extending radially alternatingly at diametrically opposite locations along the length of the shaft 44. The bottom portion of the shaft 44 has radial extensions 48 which are thicker than the paddles 46. The radial extensions 48 have contoured surfaces 50 generally conforming to the tapered inner surface portion 52 of the cylindrical member 12. A conical recess 54 is formed on the lower end of the shaft 44 and cooperates with the conical nose portion 26 of the closure member 22 with the mixing member 31 in its mixing position. The conical nose portion 26 of the closure member 22 provides a fulcrum on which the mixing member 31 rotates.

The upper end of the shaft 44 includes an axial bore 56 and a cooperating radial opening 57 adapted to be connected to a means 58 for rotating the mixing member 31, such as a hand crank, an electrical drill, a pneumatic drill, or any other conventional means for rotating the mixing member 31. As shown more particularly in FIGS. 2A–2C, the mixing member 31 may be attached to a hand crank 59 via an extension shaft 60. The extension shaft 60 may be inserted into the axial bore 56 and secured thereto by a cotter pin 61 extending through the opening 57 and a corresponding opening in the shaft 60. It should be noted that the extension shaft 60 may be connected to the mixing member 31 via any conventional means, or alternatively the shaft 60 and mixing member 31 may be formed as a single element. The hand crank 59 is keyed to the upper end of the shaft 60 via cooperating flat edges 62 which engage cooperating flat edges (not shown) on the upper end of the shaft 60. In a preferred form, the shaft 44 has a rectangular cross section and, more preferably, a square cross section, while the extension shaft 60 generally has a circular cross section and extends through a corresponding opening 63 in the cap 34.

As shown more particularly in FIGS. 3A–3B, the rotating disc 36 has an opening 64 extending therethrough permitting the mixing member 31 to extend into the mixing chamber 16 during the mixing operation. The opening 64 generally includes a square opening portion 66, that is complementary to the square cross section of the shaft 44, with radial longitudinal slot-type opening portions 68 formed on opposite sides of the square opening portion 66, permitting the paddles 46 of the mixing member 31 to extend therethrough into the mixing chamber 16. The opening portion 66 and shaft 44 may have any cross-sectional shape, as long as they are complementary. The shaft 44 is thus keyed to the disc 36 so that rotation of the mixing member 31 about its lengthwise axis 45 effectuates rotation of the disc 36 with the mixing member 31 and reciprocable member 30 in each of the first and second relative positions. It is important to note that since the radial extensions 48 at the lower end of the shaft 44 are thicker than the paddles 46, the upper end of the mixing member 31, including the attached extension shaft 60, must be directed upwardly through the rotating disc 36, before insertion of the reciprocable member 30, including the mixing member 31, into the cylindrical member 12. After inserting the mixing member 31 such that the shaft 60 projects from the opening 63 in the cap 34, the hand crank 59 may then be connected to the shaft 60.

Figure 4:
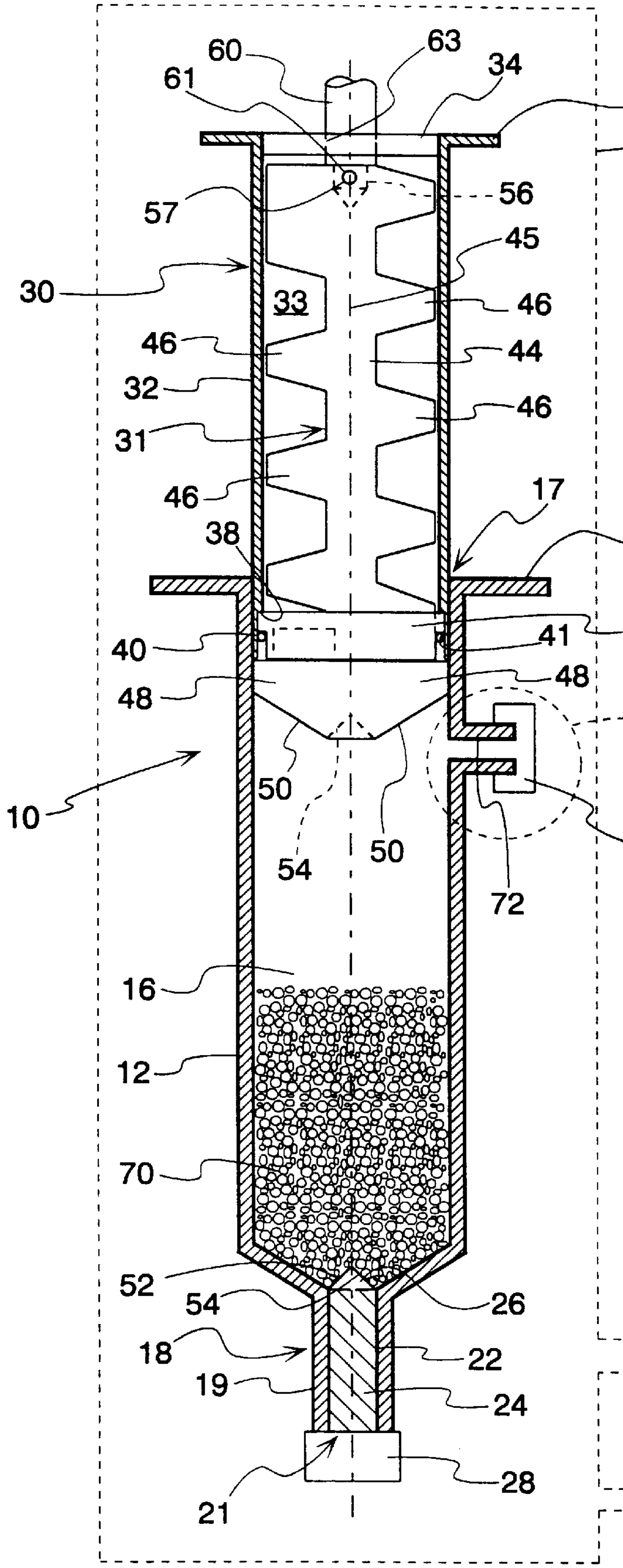
FIG. 4 is a cross-sectional view of the mixing device of the present invention in an assembled condition, with the mixing member and the reciprocable member partly introduced within the cylindrical member.

Referring now to FIG. 4, the mixing device 10 is shown with a powdered component 70 of a medical composition predisposed in the mixing chamber 16. The component 70 may be a powdered component of bone cement, such as a powdered mixture of polymethyl methacrylate, methyl methacrylate-styrene copolymer and barium sulfate, which is introduced into the mixing chamber 16 in a predetermined amount prior to assembling the medical device 10 for sale. After assembly, the medical device 10 may be placed in a hermetically sealed container 71 for sale to an end user.

Figure 5:
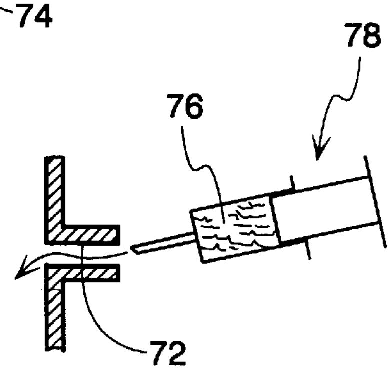
FIG. 5 is a view of the dotted portion of FIG. 4 depicting introduction of a liquid solution into the mixing chamber of the cylindrical member.

The cylindrical body 12 has a port 72 communicating in a radial direction with the mixing chamber 16. A removable cap 74 hermetically seals the port 72. When a surgeon wishes to use the mixing device 10, he/she removes the cap 74 and introduces into the mixing chamber 16, as shown more particularly in FIG. 5, the liquid component 76 of the bone cement, such as liquid methyl methacrylate monomer. This may be done using a conventional syringe, as shown at 78. Supplying the powdered component 70 of the bone cement already in the mixing chamber 16 eliminates the steps of disassembling the device 10 and pouring the powdered component 70 into the mixing chamber 16 through the open end 17 of the cylindrical member 12 and minimizes exposure of the same to ambient conditions. Applying the liquid component 76 of the bone cement through the port 72, instead of through open end 17, further minimizes ambient condition exposure. In a preferred form, the assembled medical device 10 is placed in the hermetically sealed container 71 along with a container, such as the syringe 78, containing the liquid component 76, such as liquid methyl methacrylate monomer, with the entire package being sold as a kit to an end user.

Figure 6:
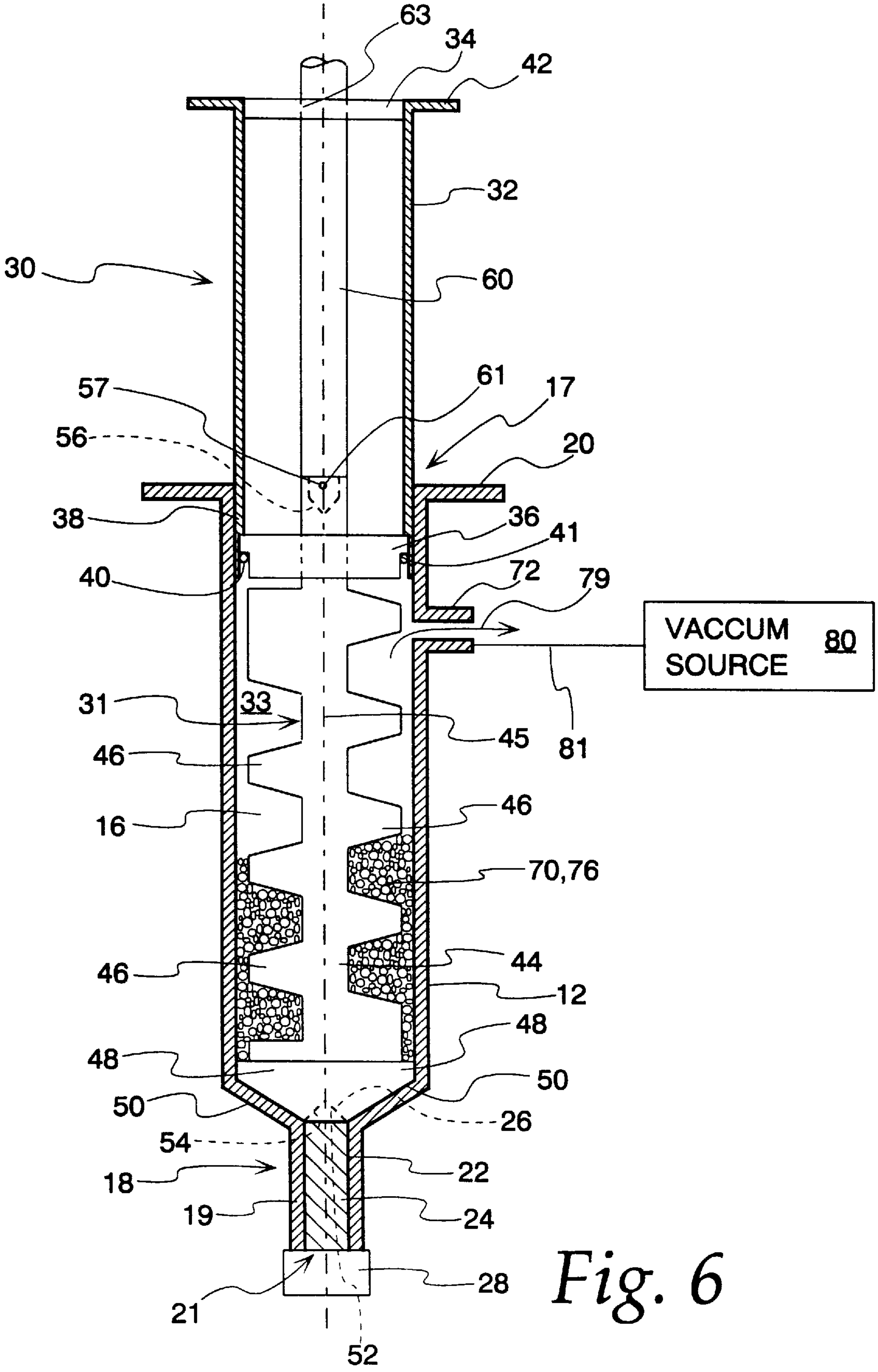
FIG. 6 is a cross-sectional view of the mixing device of the present invention in an assembled condition, with the mixing member fully introduced into the mixing chamber during a mixing operation.

After introduction of the liquid component 76 into the mixing chamber 16, the mixing member 31 is introduced within the mixing chamber 16 of the cylindrical member 12, as is shown in FIG. 6. The mixing member 31 is advanced into the mixing chamber 16 until the conical recess portion 54 receives the conical nose portion 26 of the closure member 22. In this fashion, it is assured that the paddles 46 will come in contact with the introduced cement components 70,76 contained in the mixing chamber 16 fully to the bottom of the mixing chamber portion 16.

The mixing member 31 is now ready to be connected at its upper end to a suitable mixing apparatus such as a hand crank, electrical drill, pneumatic drill, and the like, for effectuating mixing. This may be accomplished by holding the mixing device 10 in the assembled condition in a stand for mixing by the appropriate mixing apparatus and keeping it there for the required amount of time, normally about 2–4 minutes.

During the mixing operation, the powder 70 and liquid 76 components of the bone cement within the mixing chamber 16 are transformed into a thoroughly mixed and kneaded bone cement that is soft and pliable and thus ready for dispensing to fill a bone cavity and mechanically to fit a prosthesis. During mixing, all the effluent gases and toxic fumes generated during the mixing of the two components will be withdrawn through the port 72 as generally indicated by arrow 79. To effectuate removal of the effluent gases and toxic fumes, the port 72 may be connected to a vacuum source, shown schematically at 80 in FIG. 6, via a vacuum tube 81. The port 72 is formed near the upper open end 17 of the cylindrical member 12 in an area above the level of the mixed bone cement such that mixed cement will not escape therethrough.

In a preferred form, the cylindrical body 12 is made of a clear polymer which provides a user with the ability to control the speed of mixing while simultaneously viewing the mixture 70,76 in the mixing chamber 16. Being able to view the components 70,76 during mixing provides a user with a tactile sense of the consistency of the mixture 70,76 without having to actually touch the mixture 70,76 to determine its viscosity and thus exposing the mixture 70,76 to ambient conditions. Accordingly, a medical composition having desired properties may be consistently achieved.

Once mixing is complete, the mixing member 31 is removed from the mixing chamber 16. Removal of the mixing member 31 is accomplished by simply pulling the mixing member 31 axially outward of the cylindrical member 12. No aligning of paddles 46 is necessary since the shaft 44 of the mixing member 31 is keyed to the disc 36 with the paddles 46 and slot-type opening portions 68 aligned. As the mixing member 31 is removed, the cooperating radial openings 68 in the rotating disc 36 scrape off any excess mixture of cement from the paddles 46. The mixing member 31 is pulled axially along the axis 45 until the radial extensions 48 contact the rotating disc 36. Since the radial extensions 48 are thicker than the paddles 46, the radial extensions 48 completely cover the radial openings 68 in the disc 36 and thus provide a complete seal preventing any excess mixed cement from escaping into the reciprocating member 30.

Following withdrawal of the mixing member 31 into the reciprocating member 30, the vacuum source 80 is disengaged from the port 72. As is previously noted, the port 72 is formed near the upper open end 17 of the cylindrical member 12, so as to find itself in an area well above the mixed bone cement. This is an area which is occupied by the reciprocating member 30 during the dispensing operation, and consequently no mixed cement will escape through the port 72 during the dispensing operation.

The surgeon will then remove the closure member 22 from the neck 19 of the cylindrical member 12 by either pulling or unscrewing the closure member 22 from the neck 19. The dispensing operation may take place immediately by the surgeon's simply grasping the dispensing device 10 in the palm of his/her hand and with his/her thumb applying pressure on the flange 42 of the reciprocable member 30. While holding the flange 20 of the cylindrical member 12 firmly in his/her hand, he/she slowly and steadily axially displaces the reciprocable member 30 within the mixing chamber 16 toward the lower narrowed end 18, so as to dispense gradually the mixed bone cement through the opening 21 in the neck 19 into the bone situs.

Figure 7:
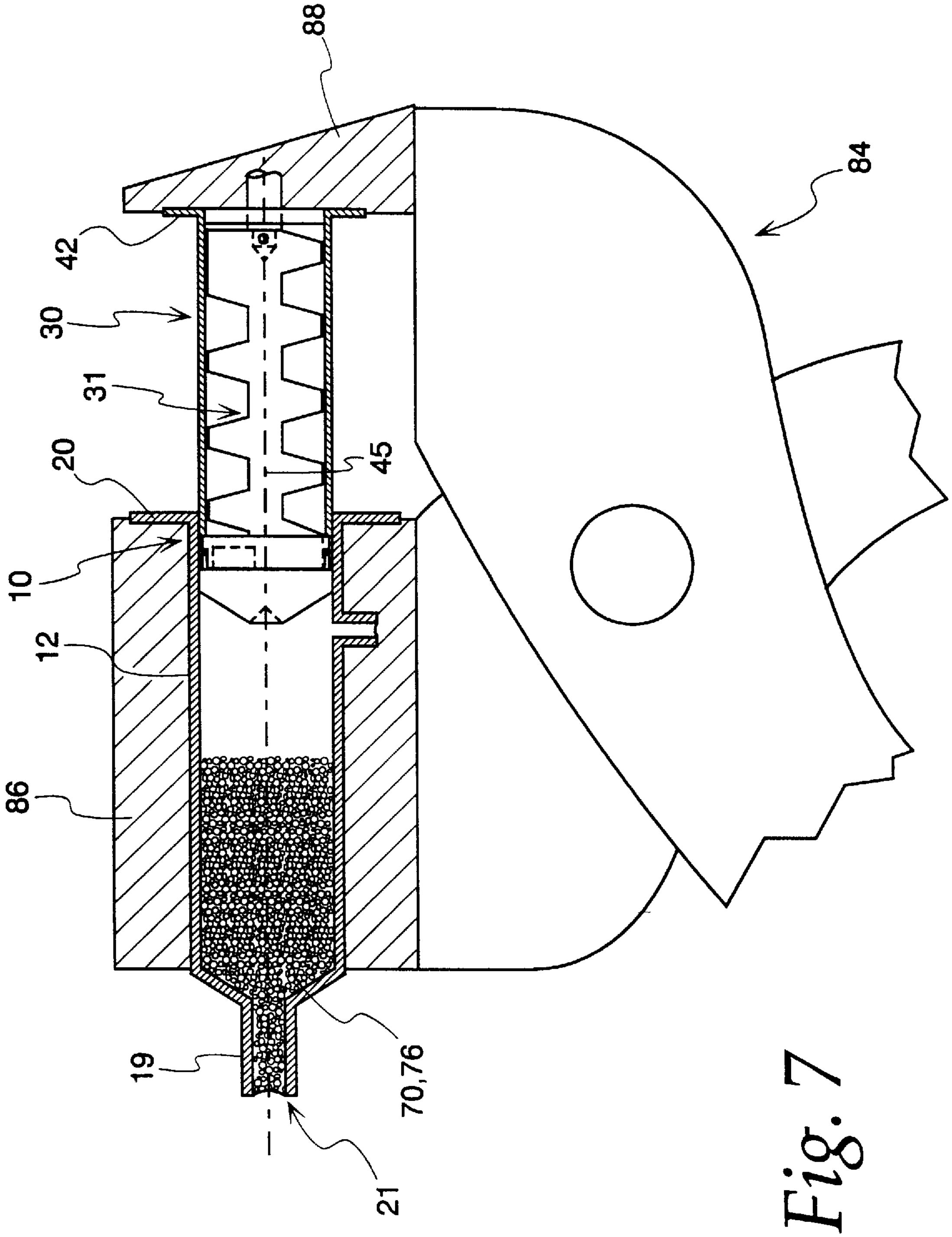
FIG. 7 is a reduced, cross-sectional view of the mixing device of the present invention, with the closure member removed, with the already mixed cement therein and mounted within a suitable evacuation implement, such as a caulking gun.

The surgeon, if he/she wishes, may utilize a mechanical force application system for the dispensing operation as shown in FIG. 7. The mixing device 10 may be positioned in a force apply device 84, which may be a caulking gun as shown, so as to position the flange 20 of the cylindrical member 12 in a front jaw 86 and the flange 42 of the reciprocable member 30 in a rear jaw 88. Then, as is well known, by taking the caulking gun 84 in hand, he/she may easily effect the axial displacement of the reciprocable member 30 within the mixing chamber 16 cylindrical member 12 by pistol-gripping and moving two arms of the caulking gun 84 together, thus dispensing the mixed bone cement through the opening 21 the neck 19.

In a preferred form, the cylindrical member 12, the closure member 22, the reciprocable member 30 and the mixing member 31 are all made from a rigid polymer.

The foregoing disclosure of the specific embodiment of the present invention is intended to be illustrative of the broad concepts comprehended by the invention and is not to be construed as limiting the invention in any manner.

I claim:

1. An apparatus for preparing a medical composition, said apparatus comprising:

a first member defining a mixing chamber having a predetermined amount of a first medical component contained therein, said first member having first and second openings each in communication with the mixing chamber; and a mixing subassembly operatively connected to the first member so that the mixing subassembly substantially seals the first opening, said mixing subassembly comprising a mixing member and a second member receivable one within the other, wherein the first member and mixing subassembly are slidable guidingly, one within the other, between first and second relative positions with the first member and mixing subassembly operatively connected, the mixing member is supported for rotation relative to the first member about a first axis, and the mixing member comprises a shaft and a plurality of paddles projecting radially from the shaft relative to the first axis and spaced, each from the other, axially relative to the first axis.

2. The apparatus of claim 1, wherein the mixing member and the second member are repositionable relative to each other in a direction substantially parallel to the first axis between (a) a first relative position wherein a plurality of paddles on the mixing member reside within the second member and (b) a second relative position wherein a plurality of paddles on the mixing member project from the second member into the mixing chamber.

3. The apparatus of claim 1, in combination with a second medical component combinable with the first component by introduction through the second opening into the mixing chamber.

4. The apparatus of claim 1, wherein the first member has a third opening in communication with the mixing chamber, and wherein movement of the mixing subassembly in a first direction relative to the first member between the first and second relative positions for the mixing subassembly and first member effectuates dispensing of a prepared medical composition in the mixing chamber through the third opening.

5. The apparatus of claim 1, further comprising means operatively connected to the mixing member for rotating the mixing member.

6. An apparatus for preparing a medical composition, said apparatus comprising:

a first member defining a mixing chamber having a predetermined amount of a first medical component contained therein, said first member having first and second openings each in communication with the mixing chamber; and a mixing subassembly operatively connected to the first member so that the mixing subassembly substantially seals the first opening, said mixing subassembly comprising a mixing member and a second member receivable one within the other, wherein the first member and mixing subassembly are slidable guidingly, one within the other, between first and second relative positions with the first member and mixing subassembly operatively connected, the mixing member is supported for rotation relative to the first member about a first axis, and the mixing member comprises a shaft and a plurality of paddles projecting radially from the shaft relative to the first axis and spaced, each from the other, axially relative to the first axis, wherein the mixing member and the second member are repositionable relative to each other in a direction substantially parallel to the first axis between (a) a first relative position wherein a plurality of paddles on the mixing member reside within the second member and (b) a second relative position wherein a plurality of paddles on the mixing member project from the second member into the mixing chamber, wherein the second member comprises a body and a disc rotatably mounted relative to the body, the mixing member and disc are keyed against rotation relative to each other about the first axis with the mixing member and second member in each of the first and second relative positions.

7. A method of preparing a medical composition, said method comprising the steps of:

providing a first member defining a mixing chamber and having first, second, and third openings each in communication with the mixing chamber;

introducing a predetermined amount of a first medical component into the mixing chamber through the first opening;

providing a mixing subassembly comprising a mixing member and a second member receivable one within the other;

operatively connecting the mixing subassembly to the first member so that the mixing subassembly substantially blocks the first opening;

with the mixing subassembly operatively connected to the first member, introducing a second medical component into the mixing member through the second opening;

moving the mixing member to mix the first and second components into a usable composition; and controllably dispensing the usable composition from the mixing chamber through the third opening, wherein the mixing subassembly remains operatively connected to the first member as the second medical component is introduced into the mixing chamber, the first and second components are mixed into a usable composition and the usable composition is dispensed from the mixing chamber.

8. The method of preparing a medical composition according to claim 7, wherein the mixing member comprises a mixing paddle and further including the step of repositioning the mixing member relative to the second member between (a) a first relative position wherein the paddle on the mixing member resides within the second member and (b) a second relative position wherein the paddle on the mixing member projects from the second member into the mixing chamber.

9. The method of preparing a medical composition according to claim 8 wherein the step of moving the mixing member to mix the first and second medical components comprises the step of rotating the mixing member about an axis with the mixing member and second member in the second relative position to mix the first and second medical components in the mixing chamber.

10. The method of preparing a medical composition according to claim 8, wherein the step of providing a mixing subassembly comprises the steps of providing (a) a mixing member and a second member that are relatively movable along an axis between the first and second relative positions and (b) a mixing member that is keyed against rotation relative to a part of the second member about the axis with the mixing member and second member in each of the first and second relative positions.

11. The method of claim 7, wherein the first member and mixing subassembly are slidable guidingly, one within the other, between first and second relative positions with the first member and mixing subassembly operatively connected, and wherein the step of controllably dispensing the usable composition from the mixing chamber through the third opening comprises the step of guidably sliding the mixing subassembly in a first direction relative to the first member between the first and second relative positions.

12. The method of preparing a medical composition according to claim 11, further including the steps of providing a driving means, connecting the driving means to the mixing member, and operating the driving means to reposition the mixing member and second member between the first and second relative positions.

13. The method of preparing a medical composition according to claim 12, wherein the step of operating the driving means comprises the step of operating the driving means to rotate the mixing member with the mixing member and second member in the second relative position.

14. A method of preparing a medical composition, said method comprising the steps of:

providing a first member defining a mixing chamber and having first and second openings each in communication with the mixing chamber;

introducing a predetermined amount of a first medical component into the mixing chamber through the first opening;

providing a mixing subassembly comprising a mixing member and a second member receivable one within the other;

operatively connecting the mixing subassembly to the first member so that the mixing subassembly substantially blocks the first opening; and with the mixing subassembly operatively connected to the first member, introducing a second medical component into the mixing member through the second opening, wherein the step of providing a mixing subassembly comprises the steps of providing (a) a mixing member and a second member that are relatively movable along an axis between the first and second relative positions and (b) a mixing member that is keyed against rotation relative to a part of the second member about the axis with the mixing member and second member in each of the first and second relative positions, wherein the second member comprises a body and a disc rotatably mounted relative to the body, the mixing member and disc are keyed against rotation relative to each other about the axis with the mixing member and second member in each of the first and second relative positions, wherein the mixing member comprises a mixing paddle and further including the step of repositioning the mixing member relative to the second member between (a) a first relative position wherein the paddle on the mixing member resides within the second member and (b) a second relative position wherein the paddle on the mixing member projects from the second member into the mixing chamber.

15. A kit for preparing a medical composition requiring first and second medical components to produce desired properties, said kit comprising:

a first member having a mixing chamber and first and second openings each in communication with the mixing chamber;

a predetermined amount of a first medical component disposed in the mixing chamber;

a mixing subassembly operatively connected to the first member so that the mixing subassembly substantially seals the first opening, said mixing subassembly comprising a mixing member and a second member receivable one within the other; and a predetermined amount of a second medical component introducible through the second opening to combine with the first medical component in the mixing chamber to produce a composition with desired properties, said mixing member and first and second members being movable selectively relative to each other to mix the first and second medical components in the mixing chamber and dispense the mixed first and second medical components from the mixing chamber.

16. The kit according to claim 15, wherein said first member with the predetermined amount of the first medical composition and operatively connected to the mixing subassembly are packaged together with the predetermined amount of the second medical component in a hermetically sealed container.

17. The kit according to claim 16 wherein the predetermined amount of the second medical component is contained in a device that is usable to introduce the second medical component through the second opening and the device is packaged in the hermetically sealed container.

18. The kit according to claim 17 wherein the device within which the second medical component is contained is a syringe.

19. The kit according to claim 15, wherein the second medical component is introducible by a user into the mixing chamber through the second opening.

20. The kit according to claim 15, wherein the mixing member comprises a mixing paddle, and wherein the mixing member is repositionable relative to the second member between (a) a first relative position wherein the paddle on the mixing member resides within the second member and (b) a second relative position wherein the paddle on the mixing member projects from the second member into the mixing chamber.

21. The kit according to claim 20, wherein the mixing member and second member are relatively movable along an axis between the first and second relative positions and wherein the mixing member is keyed against rotation relative to a part of the second member about the axis with the mixing member and second member in each of the first and second positions.

22. The kit according to claim 20, wherein the mixing member comprises a shaft supported for rotation relative to the first member about a first axis and a plurality of paddles projecting radially from the shaft relative to the first axis and spaced from each other relative to the first axis.

23. A kit for preparing a medical composition requiring first and second medical components to produce desired properties, said kit comprising:

a first member having a mixing chamber and first and second openings each in communication with the mixing chamber;

a predetermined amount of a first medical component disposed in the mixing chamber; and a mixing subassembly operatively connected to the first member so that the mixing subassembly substantially seals the first opening, said mixing subassembly comprising a mixing member and a second member receivable one within the other, wherein the mixing member comprises a mixing paddle, and wherein the mixing member is repositionable relative to the second member between (a) a first relative position wherein the paddle on the mixing member resides within the second member and (b) a second relative position wherein the paddle on the mixing member projects from the second member into the mixing chamber, wherein the mixing member and second member are relatively movable along an axis between the first and second relative positions and wherein the mixing member is keyed against rotation relative to the second member about the axis with the mixing member and second member in each of the first and second positions, wherein the second member comprises a body and a disc rotatably mounted relative to the body, the mixing member and disc are keyed against rotation relative to each other about the axis with the mixing member and second member in each of the first and second relative positions.

* * * * *